United States Patent [19]
Guede

[11] Patent Number: 5,742,351
[45] Date of Patent: Apr. 21, 1998

[54] DEVICE FOR ENCODING SEQUENCES OF FRAMES CONSTITUTED BY FILM-TYPE IMAGES AND VIDEO-TYPE IMAGES, AND CORRESPONDING DECODING DEVICE

[75] Inventor: Frédérique Guede, le Plessis Trevise, France

[73] Assignee: U.S. Philips Corporation, New York, N.Y.

[21] Appl. No.: 541,024

[22] Filed: Oct. 11, 1995

Related U.S. Application Data

[63] Continuation of Ser. No. 214,881, Mar. 15, 1994.

[30] Foreign Application Priority Data

Mar. 17, 1993 [FR] France .................. 93 03089

[51] Int. Cl.⁶ .................................................. H04N 11/20
[52] U.S. Cl. ................... 348/459; 348/469; 348/638
[58] Field of Search .................................. 348/459, 469, 348/742, 751, 752, 761, 762, 638, 639; 358/60, 61, 64, 66, 231, 232, 237, 236; H04N 7/01, 11/20

[56] References Cited

U.S. PATENT DOCUMENTS

| | | | |
|---|---|---|---|
| 3,882,539 | 5/1975 | Faroudja | 360/11 |
| 4,633,293 | 12/1986 | Powers | 348/443 |
| 4,935,816 | 6/1990 | Faber | 358/160 |
| 4,982,280 | 1/1991 | Lyon et al. | 348/911 |
| 4,998,167 | 3/1991 | Jaqua | 348/443 |
| 5,027,206 | 6/1991 | Vreeswijk et al. | 358/141 |
| 5,111,292 | 5/1992 | Kuriacose et al. | 348/384 |
| 5,221,966 | 6/1993 | Clayton et al. | 348/443 |
| 5,291,280 | 3/1994 | Faroudja et al. | 348/447 |
| 5,317,398 | 5/1994 | Casavant et al. | 348/441 |
| 5,337,154 | 8/1994 | Doricott et al. | 348/448 |
| 5,365,273 | 11/1994 | Correa et al. | 348/452 |

FOREIGN PATENT DOCUMENTS 2258580 2/1993 United Kingdom ............ H04N 7/01

*Primary Examiner*—Glenton B. Burgess
*Attorney, Agent, or Firm*—Laurie E. Gathman

[57] ABSTRACT

A device for encoding sequences of frames constituted by video-type images of a first frequency (for example, 30 Hz) and film-type images whose original frequency is lower than this first frequency (for example, 24 Hz) and which are converted by means of the "3:2 pulldown" technique.

The encoding device comprises;
- a circuit for detecting the sequences of film-type images from the stream of input data, and
- a device for preprocessing these sequences for realizing an inverse conversion of the frequency by eliminating, before encoding, the redundant information introduced by the use of the "3:2 pulldown" method.

14 Claims, 9 Drawing Sheets

5,742,351

DEVICE FOR ENCODING SEQUENCES OF FRAMES CONSTITUTED BY FILM-TYPE IMAGES AND VIDEO-TYPE IMAGES, AND CORRESPONDING DECODING DEVICE

This is a continuation of application Ser. No. 08/214,881, filed Mar. 15, 1994.

BACKGROUND OF THE INVENTION

The invention relates to a device for encoding digital signals, referred to as input signals, corresponding to sequences of frames constituted by video-type images and film-type images, which device comprises:
   means for encoding the input signals,
   means for detecting the sequences of film-type images from a stream of input signals,
   means for switching, in response to the detection, from a first to a second mode of operation of the encoding means.

Such a device finds important applications in the field of transmitting animated images, notably for television systems operating at a frequency of 60 Hz, and it is particularly adapted to encode digital signals in conformity with the MPEG standard (whose essential features will be described hereinafter).

An encoding device of the above-mentioned type is described in U.S. Pat. No. 5,027,206. Although it describes a purpose which is ultimately different from that envisaged in the present Application, this document discloses the principle in accordance with which the operating conditions of an encoding device can be adjusted as a function of the image types. The device described, which relates to the compatible reception of high-definition television images and television images of a lower definition, includes a motion estimator whose thresholds and operating ranges are modified according as the images are either of the video type or of the film type, with the principal object of obtaining a less costly encoding and decoding system.

SUMMARY OF THE INVENTION

It is a first object of the invention to provide an encoding device in which a different kind of modification in accordance with the image types is used in view of a better adaptation to the encoder of signals which are representative of these types.

To this end an encoding device according to the invention as described in the opening paragraph is characterized in that:
   the detection means comprise a circuit for marking at least a characteristic sign of a sequence of film-type images,
   exclusively in the second mode of operation, the encoding means comprise a stage for preprocessing the input signals to be encoded.

Thus, the film or video nature of the sequence of frames is detected before their encoding by subjecting them to a preprocessing operation in one of the two cases.

It is another object of the invention to provide an encoding device with which it is particularly possible to meet the situation in which original film-type images having a frequency below that of video-type images in a given ratio have previously been separated into two interlaced fields and are subsequently brought to the same frequency as that of the video-type images by duplicating an appropriate number of these fields, fixed by said ratio.

To this end the encoding device according to the invention is characterized in that said characteristic sign is the pattern, referred to as film pattern, which is formed by these duplicated fields in a sequence of frames, and in that the preprocessing operation in the second mode of operation in response to the detection of the film pattern consists of realising an inverse conversion of the frequency by eliminating, before the encoding operation, the fields introduced by duplication.

The pretreatment of original film-type images for adapting them to the frequency and to the interlaced arrangement of video-type images introduces, in the corresponding signals to be encoded, a supplement of data without any contribution of information, and the useless encoding of these supplementary data contributes to a deterioration of the quality of the frames which are subsequently restored. This drawback can be obviated by the above-described encoding device which suppresses these supplementary data before the encoding operation when there are film-type images.

In a particular embodiment of an encoding device according to the invention the detection means comprise:
   a picture memory for storing a sequence of frames which is sufficiently long to allow detection of the film pattern,
   a comparator for detecting the film pattern in this sequence of frames.

This embodiment is particularly advantageous in countries like the United States or Japan where the television systems operate at a frequency of 60 Hz, i.e. where the picture frequency is 30 interlaced frames per second. As the original film-type frames are produced at the frequency of 24 sequential frames per second, it is necessary to realise a frequency conversion in a ratio of 5/4 for visualizing a sequence of film-type images on television. The technique currently used, which is known as "3:2 pulldown" will be described hereinafter. It consists of creating five interlaced frames which can be visualized on television, based on four original sequential film-type frames by dividing each of these frames by two so as to form two odd and two even fields and by duplicating two of these eight fields thus obtained. It is these two supplementary fields obtained by duplication which, within the scope of the present invention, constitute the redundant information to be suppressed.

In a preferred embodiment of an encoding device according to the invention, the encoding means comprise an MPEG encoder authorizing encoding only per group of frames of a predetermined length. In this case the detection means comprise a control circuit for verifying whether a frequency conversion is authorized for the current frame, while taking the restrictions imposed by the encoding operation into account.

Moreover, the detection means advantageously comprise a circuit for detecting motion between the fields of the sequence of frames which do not constitute the film pattern, so as to prevent switching to the second mode of operation when there is no motion.

In fact, it is necessary to avoid a too large number of switching operations at very short intervals and it is particularly useless to change the mode of operation for a fixed sequence of frames.

In a preferred embodiment of the device according to the invention, the preprocessing stage comprises a reading circuit for reading, at regular time intervals, only interlaced fields which correspond to an original film-type image from the picture memory.

The redundant fields of the sequence of film-type images are thus eliminated during reading and are not applied to the MPEG encoder which thus alternately receives video-type image sequences at 30 Hz and original film-type image sequences at 24 Hz.

The invention also relates to a device for decoding signals, referred to as encoded signals, corresponding to frame sequences comprising video-type image sequences and film-type image sequences which have previously been encoded, which device comprises a module for restoring the frame sequences and is characterized in that it also comprises:

means for reading the frequency of a sequence of frames from a stream of encoded signals, means for switching, in response to reading of the frequency, from a first to a second mode of operation of the module for restoring the frame sequences, said module for restoring the frame sequences comprising, exclusively in the second mode of operation, a stage for converting the frequency of the decoded film-type images into the frequency of the video-type images.

These and other aspects of the invention will be apparent from and elucidated with reference to the embodiments described hereinafter.

DETAILED DESCRIPTION OF PREFERRED EMBODIMENTS

Figure 1:
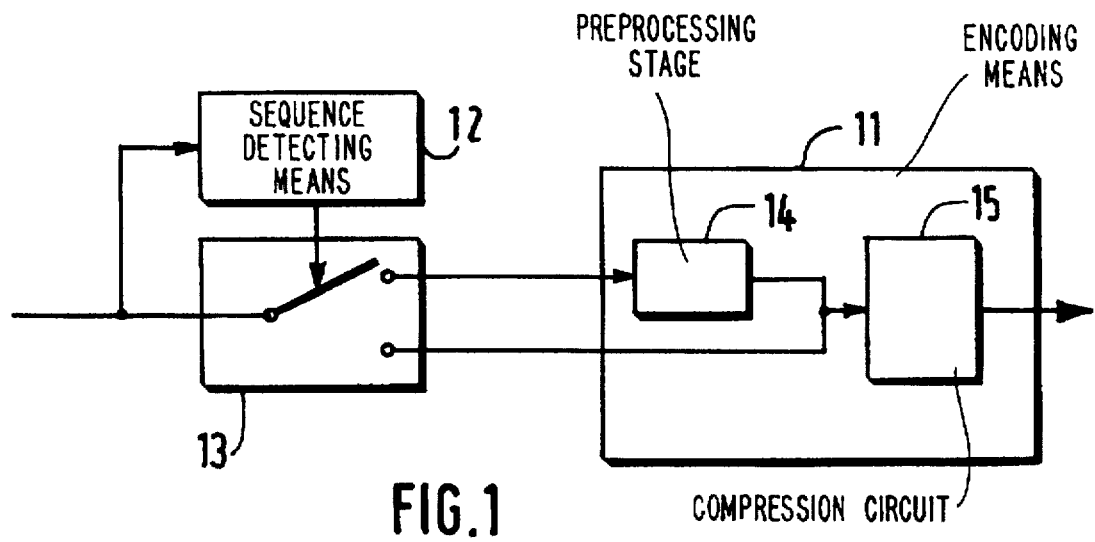
FIG. 1 shows an example of the functional diagram of an encoding device according to the invention.

The encoding device shown in FIG. 1 comprises means 11 for encoding input signals, means 12 for detecting sequences of film-type images from a stream of input signals and means 13 for switching, in response to this detection, from a first to a second mode of operation of the encoding means 11. More specifically, the detection means 12 comprise a circuit for marking at least a characteristic sign of a sequence of film-type images. The encoding means 11 comprise a stage 14 for preprocessing the signals to be encoded, which stage is activated in the second mode of operation only, and a circuit 15 for compressing frames.

Figure 2:
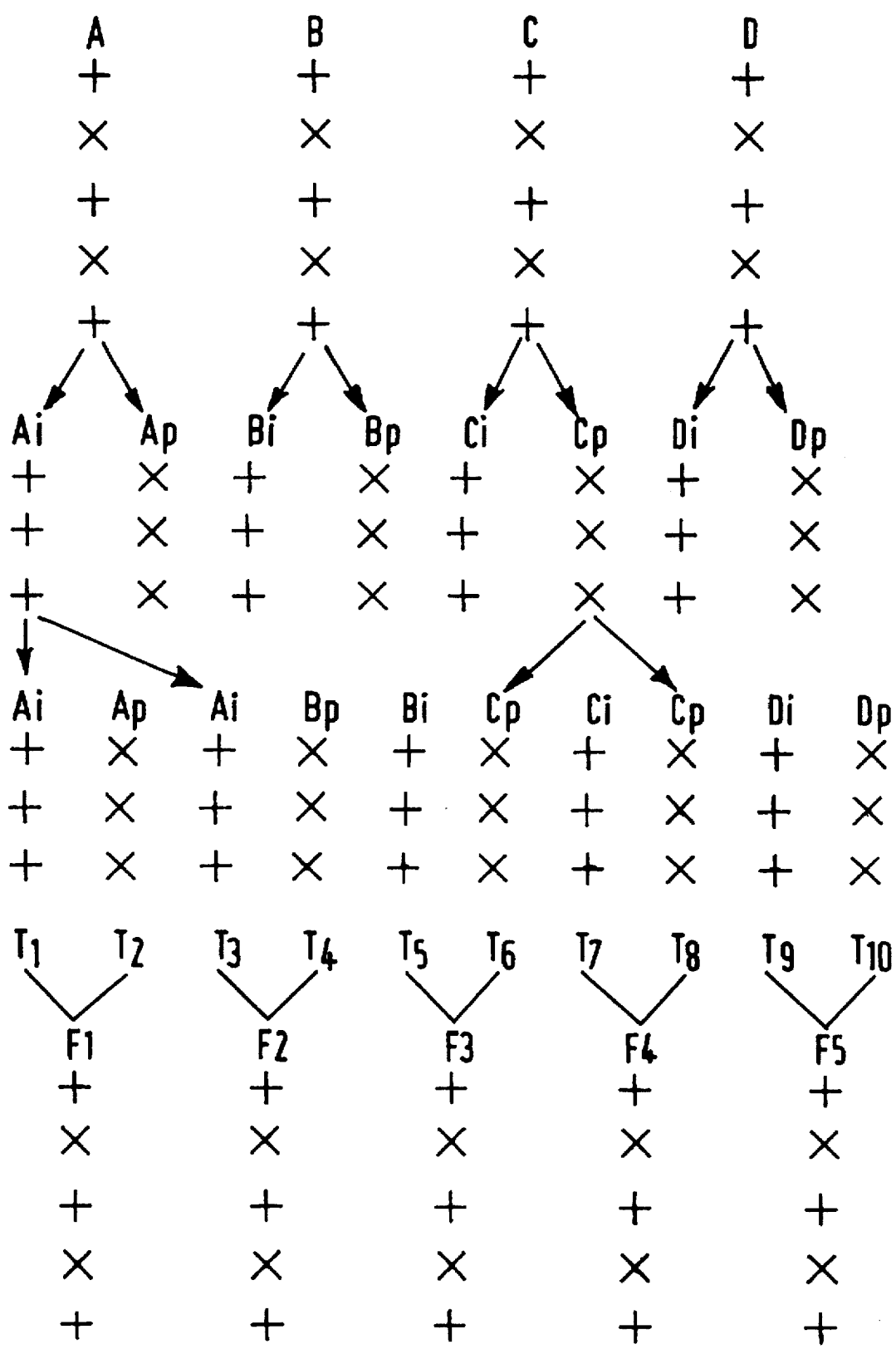
FIG. 2 is a diagram showing the principle of operation of the "3:2 pulldown" technique.

When in the sequence of incoming frames original film-type images having a frequency of 24 sequential frames per second alternate with video-type images having a frequency of 30 interlaced frames per second in, for example the United States and Japan, it is customary to align the structure of the film-type images to that of the video-type images by means of the "3:2 pulldown" technique which will be described in greater detail with reference to FIG. 2.

With this "3:2 pulldown" technique original sequences of 24 sequential frames per second can be converted into a sequence of 30 interlaced frames per second (30 Hz). The ratio between these two rates is 5:4, i.e. four original film-type images must be transformed into five frames which can be produced on television. This is a periodical transformation, each period of which comprises four original film-type images. Its principle is described with reference to four original film-type images A, B, C and D. Two odd and two even fields Ai and Ap, Bi and Bp, Ci and Cp, Di and Dp are formed from each of them, the odd field being formed with the odd lines of the original frame and the even field being formed with its even lines. Subsequently, a new sequence of frames at a frequency of 30 Hz is formed by repeating two of these eight fields Ai and Cp and by regrouping Ai and Ap, Ai and Bp, Bi and Cp, Ci and Cp, Di and Dp so that five frames F1 to F5 are formed. This sequence of frames shows a pattern referred to as film pattern: the first field of the frame F1 is equal to the first field of the frame F2 and the second field of the frame F3 is equal to the second field of the frame F4. These notations F1 to F5, referred to as frame types, will be used as references in the course of this description for indicating the position of a film-type image with respect to the period of transformation.

It is this pattern which constitutes the characteristic sign to be searched for detecting a sequence of film-type images among a stream of incoming signals, and the envisaged preprocessing operation is carried out to eliminate the two supplementary fields Ai and Cp before the encoding operation, which supplementary fields constitute the redundant information.

The film pattern is thus identified in a sequence of frames by comparing the first fields of a first and a second frame and by comparing the second fields of a third and a fourth frame. It is thus necessary to use a search window for these comparisons, comprising at least four frames. The displacement of this search window for identifying the film pattern in a sequence of frames can be effected in accordance with several schemes. A first possible scheme would be the displacement of a frame within a frame. A second scheme would be, for example a displacement per group of four frames. The first scheme will be used in the course of this description.

Before continuing this description, it appears to be necessary to recall the characteristic principles of the MPEG standard because a preferred embodiment of the encoding device according to the invention is adapted to this standard which imposes a certain number of restrictions.

The MPEG1 standard, which was developed in recent years by the standardization group MPEG (Moving Pictures Expert Group) has for its object to propose an efficient method of compressing animated frames converted in a digital form and associated audio data. This encoding standard, which is based on a certain number of techniques which will not be described in detail, particularly provides for the reduction of temporal redundance in the sequence of animated frames by using the similarity which may exist between a frame of this sequence of frames and the frames which precede or follow.

More specifically, the frames may belong to three different categories in accordance with the associated encoding mode. The frames I (intra-coded) are encoded independently of other frames, the frames P (predictive-coded) are predicted by unidirectional motion compensation based on a preceding or following frame of the I or P category, and the frames B (bidirectionally predictive-coded) are predicted by bidirectional motion compensation based on a previous frame and a subsequent frame of the I or P category. Several frames constitute a group of frames referred to as GOP (Group Of Pictures) within which they are placed, for the purpose of encoding, in the order in which the decoder needs them (in fact, a frame B cannot be decoded before the subsequent frame which serves for its prediction; it is thus placed in its sequence for encoding). The frames are restored in their natural order at the start of the decoding process. Each start of the GOP has a header which contains the characteristics of this GOP. The distribution of the different categories of frames within a GOP is based in general (but not obligatorily) on the following rules. To permit random access and a switching of channels, each GOP must be autonomous, i.e. it should be possible to be encoded independently of other GOPs. The first frame of a GOP is a frame B and its second frame is a frame I, which means that the first encoded frame is a frame I and that consequently the start of the GOP is independent of what precedes it. Similarly, the last frame of the GOP is a frame of the category I or P, so that the end of the GOP is independent of that which succeeds it. Finally, the succession of frames is generally periodical: the distance between a frame P and the next frame of the category P or I can be fixed by means of a parameter M and a parameter N indicates the maximum number of frames contained in a GOP. In practice, the frames I, which are encoded independently of other frames, are more costly as regards information and their use is thus limited. In the embodiments described hereinafter, these rules are respected and the number of frames I per GOP is limited to one. Finally, several GOPs are regrouped in a sequence which contains a header comprising an indicator for the start of the sequence and the characteristics of the sequence. Particularly, it comprises the frequency of the frames contained in the sequence. This means that at each change of frequency of the frames to be encoded, a new sequence, and thus a new GOP must start.

Figure 3:
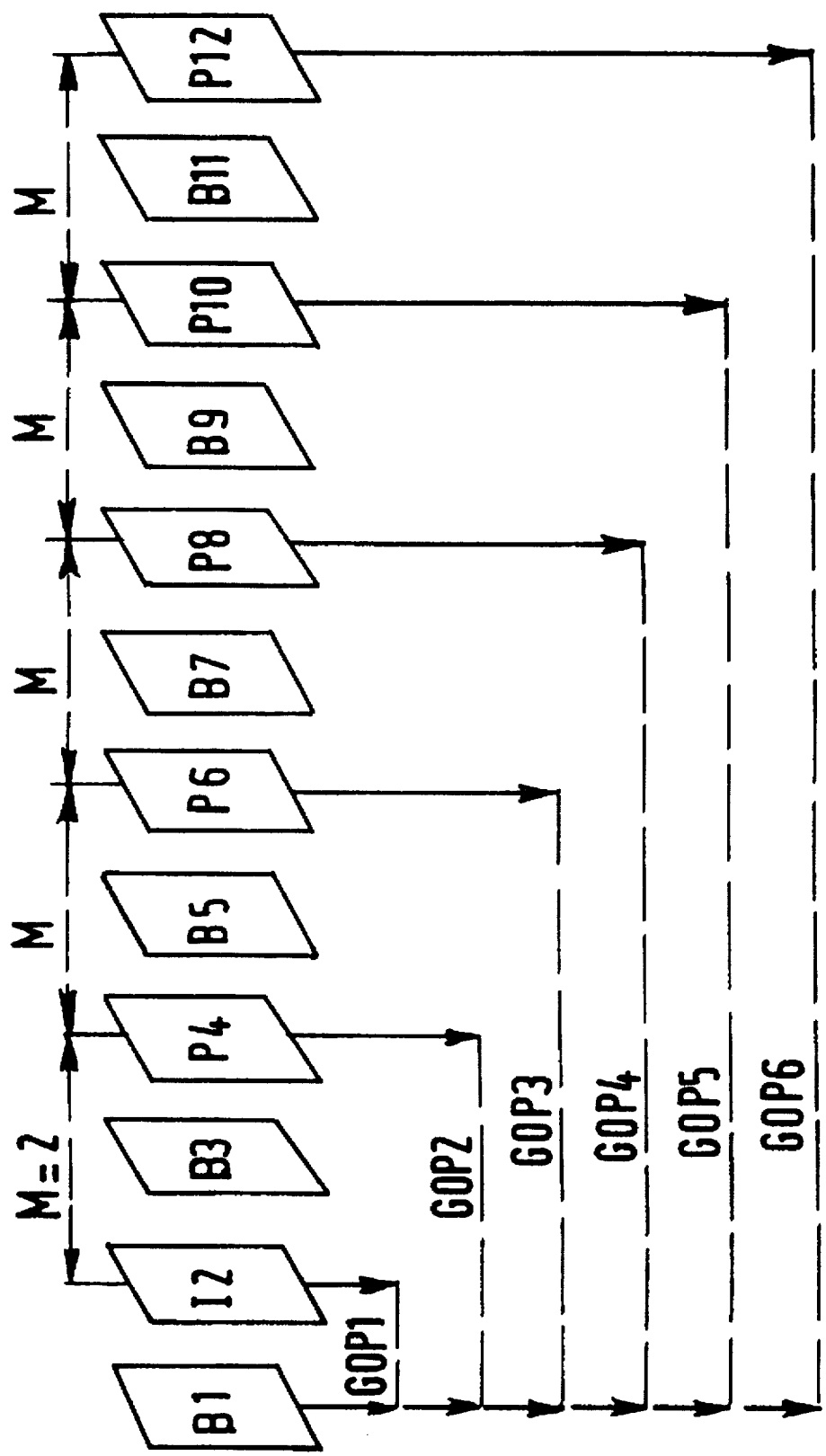
FIGS. 3 and 4 are examples for constructing the sequence of frames in conformity with the requirements of the MPEG standard.

FIG. 3 shows an example of the GOP construction in the case where the parameters M and N are chosen to be equal to 2 and 12, respectively. Under these conditions, and taking the restrictions described in the previous paragraph into account, six GOP formats are possible. These six formats (GOP1 to GOP6) are represented by means of a first frame B1. GOP1 comprises two frames B1 and I2; GOP2 comprises four frames B1, I2, B3 and P4; GOP3 comprises six frames B1 to P4, followed by B5 and P6; GOP4 comprises eight frames B1 to P6, followed by B7 and P8; GOP5 comprises ten frames B1 to P8, followed by B9 and P10; GOP6 comprises twelve frames B1 to P10, followed by B11 and P12. The first frame of each of these GOPs is a frame B (B1), the second is a frame I (I2) and the last is a frame I (I2) or a frame P (P4, P6, P8, P10 and P12). The distance between a frame P and a frame P or I is 2.

Figure 4:
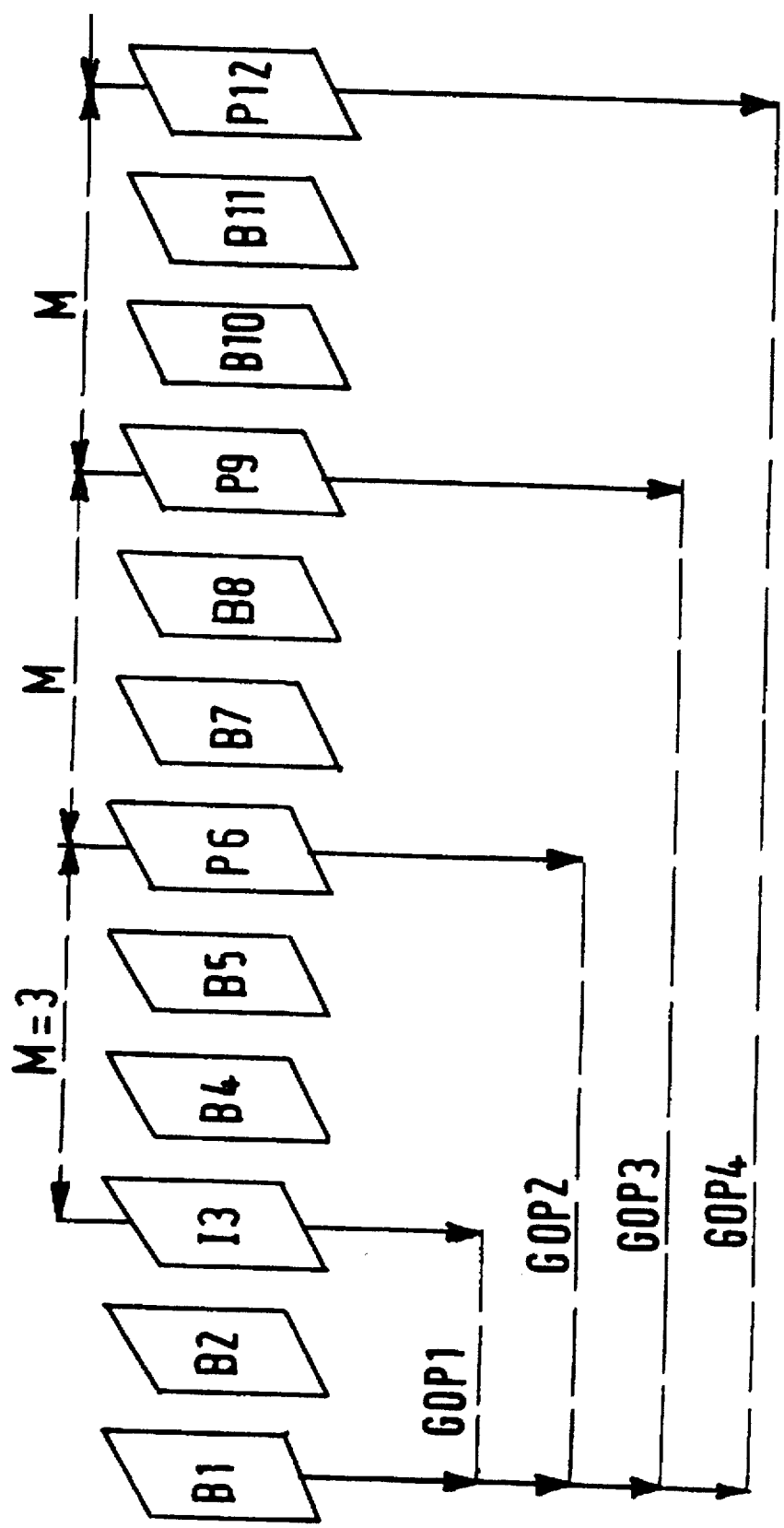

FIG. 4 is an example of a GOP construction in the case where the parameters M and N are chosen to be equal to 3 and 12, respectively. Under these conditions, and taking the previously described restrictions into account, four GOP formats are possible. These four formats (GOP1 to GOP4) are represented by means of a first frame B1. GOP1 comprises three frames B1, B2 and I3; GOP2 comprises six frames B1, B2, I3, B4, B5 and P6; GOP3 comprises nine frames B1 to P6, followed by B7, B8 and P9; GOP4 comprises twelve frames B1 to P9, followed by B10, B11 and P12. The first and second frames of each of these GOPs are the frames B (B1 and B2), the third is a frame I (I3) and the last is a frame I (I3) or a frame P (P6, P9 and P12). The distance between a frame P and a frame P or I is 3.

The case described with reference to FIG. 3 will be dealt with hereinafter, i.e. the parameters M and N are equal to 2 and 12, respectively.

As already stated, the preprocessing stage 14 described with reference to FIG. 1 eliminates, before encoding, the redundant information contained in the whole sequence of film-type images which has first been converted to 30 Hz by means of the "3:2 pulldown" technique. The frames detected as film-type frames are reconverted to their original frequency of 24 Hz before they are applied to the input of the module 15 for compressing the frames. A change of frequency in the stream of data received at module 15 is then produced. This change of frequency must coincide with a change of sequence and thus with a change of the GOP. As elucidated in a previous paragraph, a GOP always starts with a frame B. The change of frequency may thus occur at any instant, as will be seen in detail with reference to FIGS. 6 to 8. The identification of the film pattern in the sequence of frames to be encoded must be distinguished from the detection of the film-type images in the sequence of frames, which is only effected when it is possible to change the GOP.

Figure 5A:
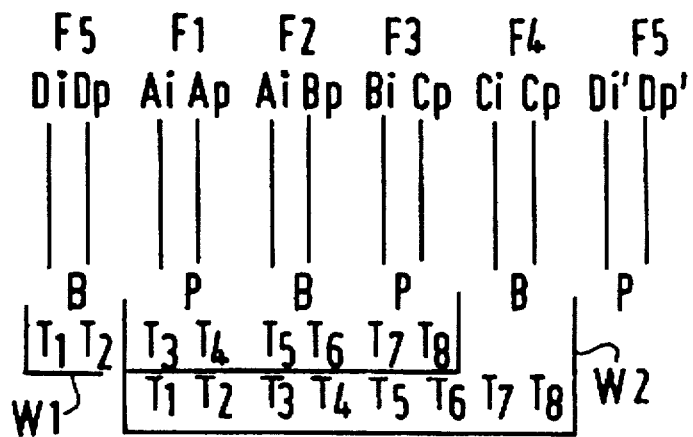
FIGS. 5 to 7 show examples of detecting the change of the type of incoming frames.
Figure 5B:
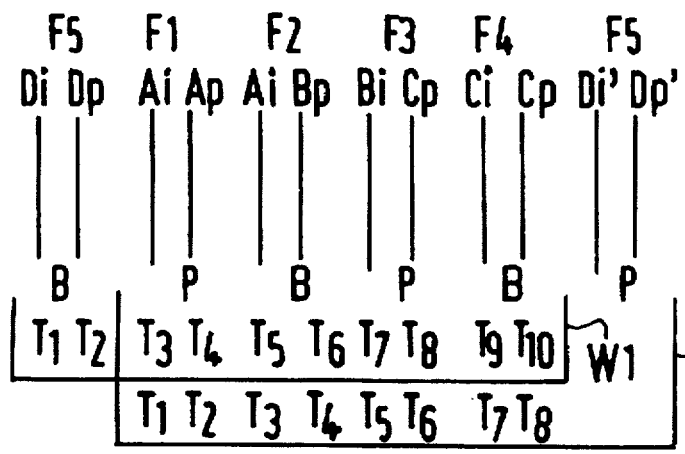

As has been seen above, the identification of the film pattern in a sequence of film-type images necessitates the use of a search window comprising at least four frames. FIG. 5 illustrates for the same sequence of frames the non-detection of the change of the type of the incoming frames with a search window comprising four frames only, and its detection with a search window comprising five frames. The stream of incoming frames is constituted by six film-type images, the first being a frame B of the type F5 and the following frames being frames of the types F1 to F5. When the search window comprises four frames, it contains the first frame of the type F5 and the following frames of the types F1 to F3 in a first position W1. The film pattern is thus not identified. In a second position W2 it contains the frames of the types F1 to F4 and the film pattern (T1=T3 and T6=T8 in this case) is then identified. However, the frame of the type F1 is a frame P and it is thus impossible to start a new GOP. This sequence of frames will thus be detected as a sequence of video-type images. In contrast, when the search window comprises five frames, it contains the first frame of the type F5 and the following frames of the types F1 to F4 in the position W1. The film pattern (T3=T5 and T8=T10 in this case) is thus identified and as the first frame is a frame B, it is possible to change the GOP. The sequence of frames is thus detected as a sequence of film-type images. It should be noted that if the first frame of the type F1 had been a frame B, the sequence of frames would have been detected as a sequence of film-type images in both cases. In fact, if the window comprises five frames, it contains the frames of the types F1 to F5 in the position W2. The film pattern, which then corresponds to T1=T3 and T6=T8, is thus identified; as the first frame is a frame B, it is possible to change the GOP.

With a search window of four frames, the detection of the passage to a sequence of film-type images can only be effected on a frame of the type F1 which should thus coincide with a frame B. With a search window of five frames, this can be effected on a frame of the type F1 and on a frame of the type F5 coinciding with a frame B. The detection is thus enhanced. An increase of the number of frames in the search window implies an increase of the memory size and a more complex operation. It is a matter of finding the best compromise between the detection performance and the complexity of operation.

Figure 6:
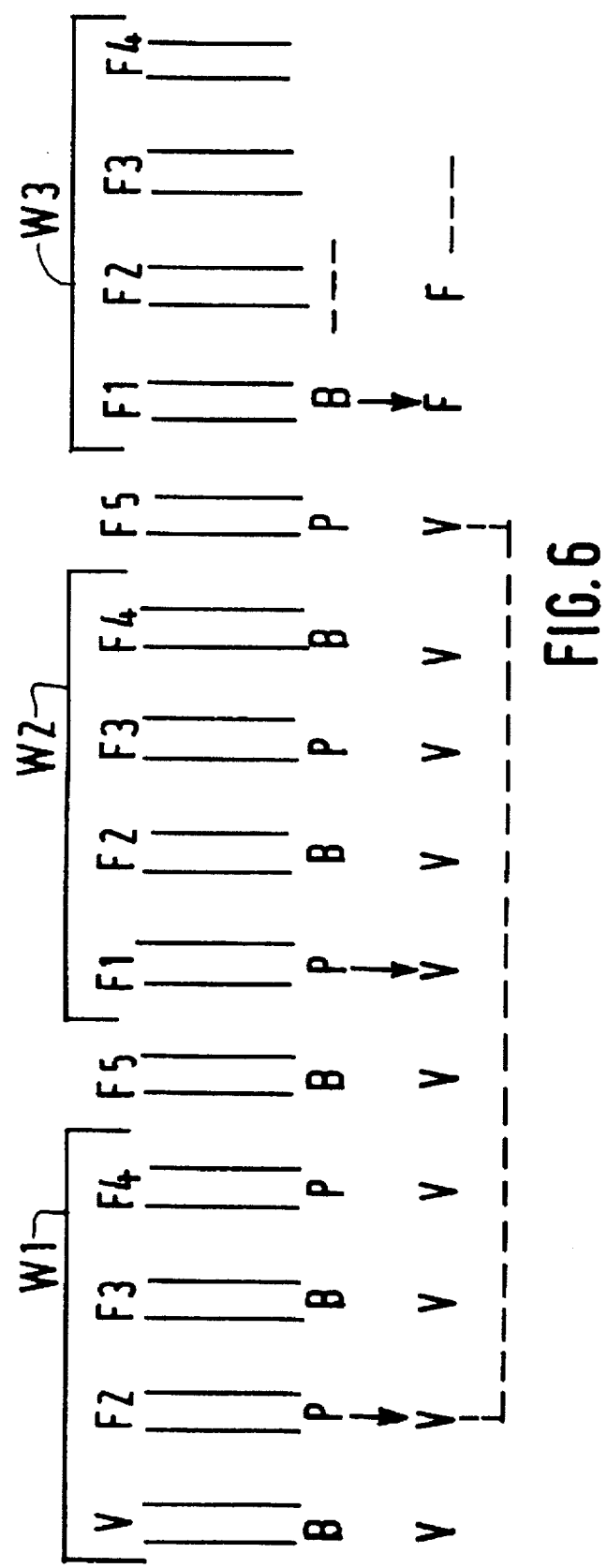

In the case of a search window of four frames, the risks of non-detection of a sequence of film-type images will be evaluated hereinafter. Two cases may arise: the non-detection of the start of a long sequence of film-type images and the non-detection of a short sequence of film-type images, isolated between two sequences of video-type images. FIG. 6 illustrates the first case. It shows a sequence of frames comprising a first video-type image V, followed by a succession of film-type images of the type Fj (j being an integer varying between 1 and 5). This sequence of film-type images starts with a frame of the type F2. When the search window is in a first position W1, it contains the first video-type image V, followed by three film-type images of the types F2 to F4. The corresponding sequence of frames does not comprise the frame of the type F1. The film pattern cannot be identified and the film type of the frames of the sequence is not detected. When the search window is in position W2, it contains four film-type images of the types F1 to F4 and the film pattern is identified. However, as the frame of the type F1 is a frame P, it is not possible to change the GOP. The frames of this second sequence are thus also detected as video-type images. With the parameter M being equal to 2, when the search window is in a third position W3 which contains the four subsequent film-type images of the types F1 to F4, the frame of the type F1 is a frame B. It is then possible to change the GOP and these frames are detected as film-type frames. The 9 frames between the first frame of the type F2 and the last frame of the type F5 are film-type images which are not detected as such. This scenario corresponds in the worst cases of non-detection to the start of a long sequence of film-type images, i.e. to the case where there is a maximum number of film-type images which are not detected as such.

Figure 7:
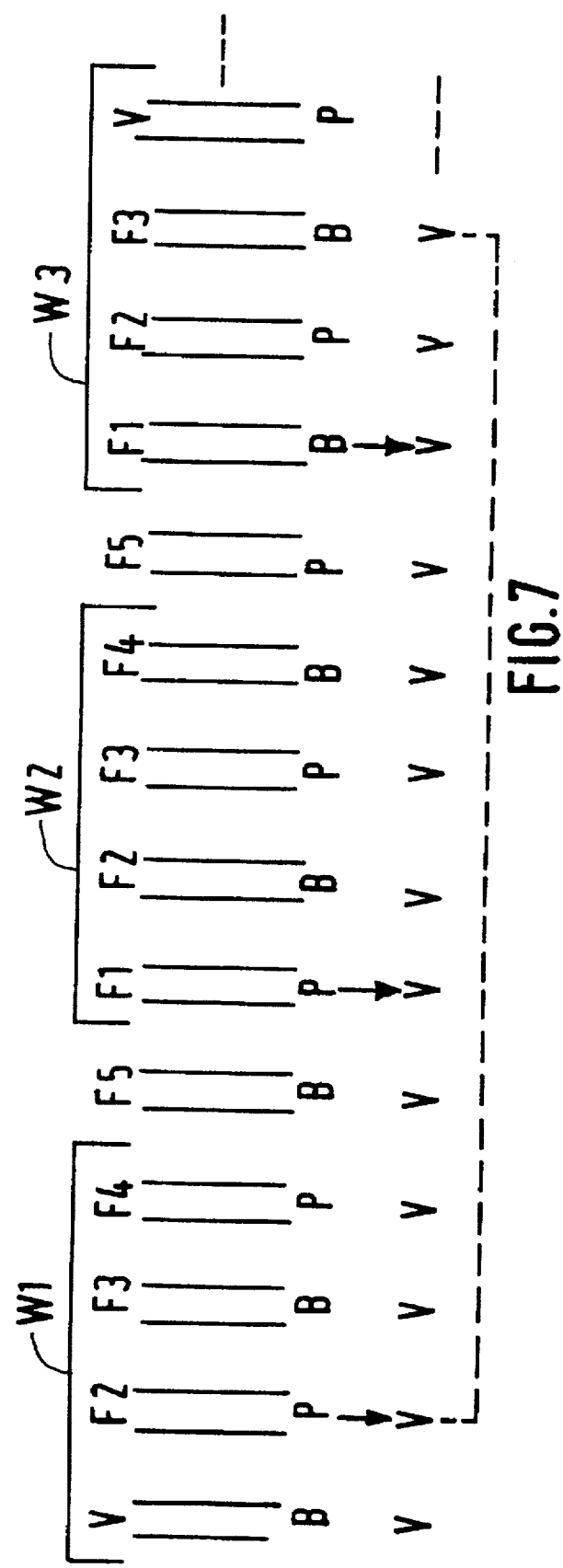

FIG. 7 illustrates the second case. It shows a first video-type image V followed by a succession of film-type images of the type Fj (where j is an integer varying between 1 and 5), starting with a frame of the type F2, which succession of film-type images is followed by video-type images V. The scenario corresponding to the positions W1 and W2 of the search window is the same as that described with reference to FIG. 6. However, when the search window is in the third position W3, it contains only three film-type images of the types F1 to F3, followed by a video-type image V. The film pattern is thus not identified and, likewise as the frame of the type F1 is a frame B, the film-type images are not detected as such. Finally, 12 film-type images (from the first frame F2 to the last frame F3) are detected as video-type images. This scenario corresponds in the worst cases of non-detection to an isolated sequence of film-type images, i.e. to the case where the non-detected sequence has a maximum length.

The non-detection of an isolated sequence of film-type images (12 frames in the worst case for a search window of four frames) slightly degrades the quality of the frames. But it permits of avoiding the too frequent transitions from one mode of operation to another. The non-detection of all first frames of a long sequence of film-type images (9 in the worst case for a search window of four frames) is inevitable. It could be enhanced by increasing the size of the search window, which detrimentally influences the complexity of operation and the required memory space. A window size of four frames seems to be a good compromise between performance and complexity of the method used. This solution will thus be maintained in the following description. The result is that the detection of the passage to a sequence of film-type images always takes place in a frame of the type F1 and that the GOPs of film-type images have a multiple length of 4 (i.e. 4, 8 or 12). Consequently, and because M=2, a GOP of film-type images always ends with a frame P.

Figure 8:
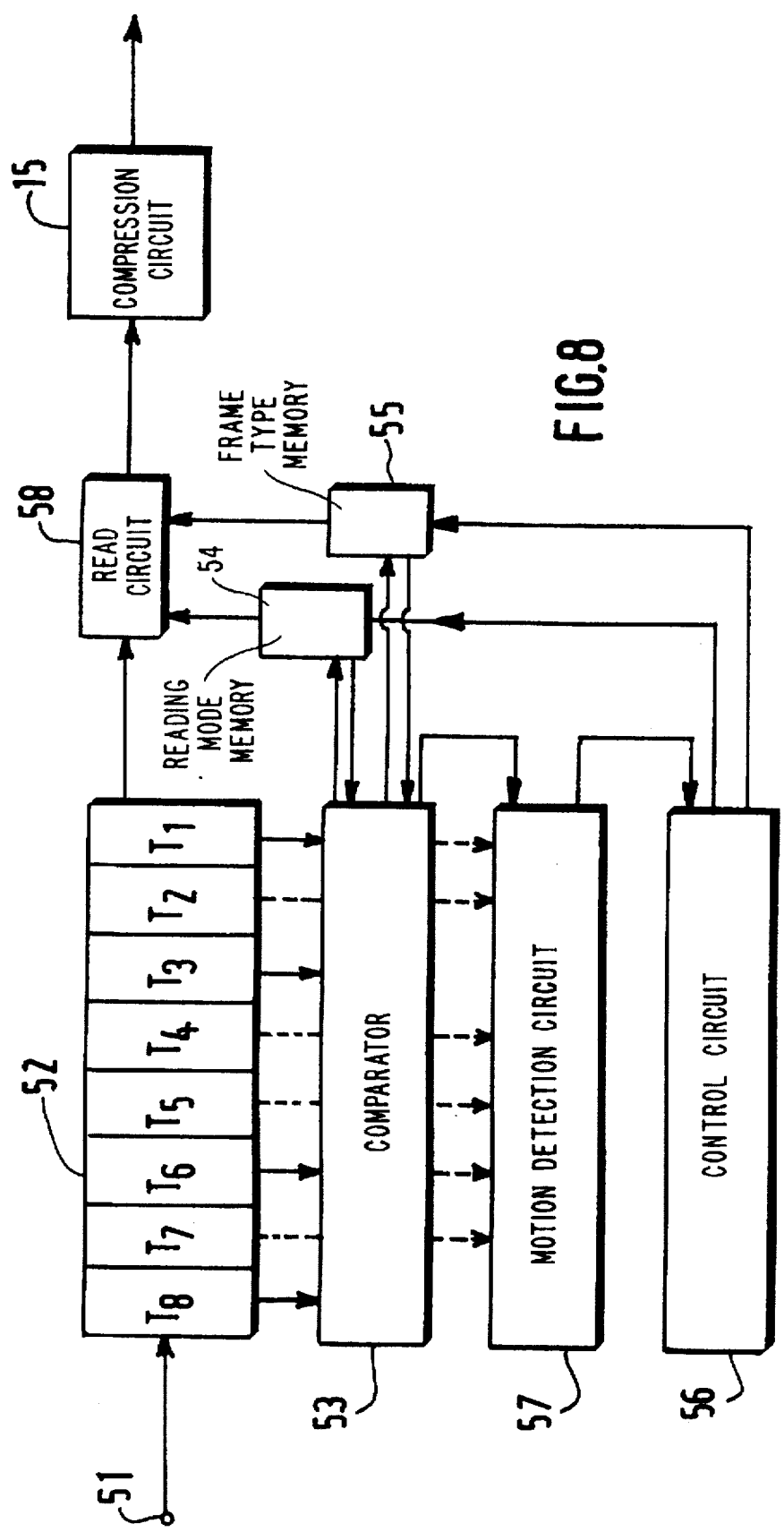
FIG. 8 shows an implementation of the encoding device according to the invention.

After the description of these various details, it is now possible to describe an embodiment of an encoding device according to the invention with reference to FIG. 8 in the case where the encoding means comprise an encoder of the MPEG type. The blocks in FIG. 1 are incorporated in the FIG. 8 embodiment but in a somewhat different arrangement explained below.

The stream of frames received at the input 51 is stored in a picture memory 52 which can simultaneously contain four frames. The fields of these frames are numbered T1 to T8 in their order of reception. The fields T1, T3, T6 and T8 are applied to a comparator 53 for identifying the possible presence of the film pattern: T1=T3 and T6=T8. The comparator 53 has reading and writing access to the contents of the two memories: a memory 54 for the reading mode and a memory 55 for the frame type. The reading mode memory 54 contains the current reading mode (film or video) of the picture memory 52 (the content in the absence of the reading mode memory 54 is the video mode). The picture memory 55 contains an integral between 1 and 5 corresponding to the type (F1, F2, F3, F4 or F8) of the current film-type image. Upon activation of the comparator 53, a motion detection circuit 57 verifies, by comparing the fields T1, T2, T4, T5, T6 and T7, whether the sequence of frames contained in the picture memory 52 is animated. Similarly, upon activation of the motion detection circuit, a control circuit 56 determines, as a function of the category of the previously encoded frame and the parameters M and N used, whether it is possible to create a new GOP. The control circuit 56 has writing access to the reading mode memory 54 and to the frame type memory 55. The frames contained in the picture memory 52 are read by a read circuit 58 in accordance with the reading mode contained in the reading mode memory 54. When a film mode is concerned, only certain fields of the picture memory 52 should be read. They are determined by the type of current frame which is itself applied to the read circuit 58 by the frame type memory 55. The read circuit 58 transmits the fields read from the picture memory 52 to the frame compression circuit 15.

The data contained in the picture memory 52 correspond at any instant to those contained in the search window. For each position of the search window, the device described with reference to FIG. 8 realises the following operations.

The comparator 53 reads the fields T1, T3, T6 and T8 from the picture memory 52 and searches the film pattern (T1=T3 and T6=T8).

If the film pattern is identified, the fields T1 and T2 correspond to a film-type image of the type F1. The comparator 53 then reads the contents of the reading mode memory 54 so as to know the reading mode used in the previous step. Two cases may then occur:

the film mode is concerned: the comparator 53 re-initializes, at 1, the value contained in the frame type memory 55 and it does not modify the content of the reading mode memory 54.

the video mode is concerned: the comparator 53 applies an order of activation to the motion detection circuit 57 so as to verify, before every change of the reading mode, whether the sequence of frames is effectively animated.

If the film pattern is not identified, the comparator 53 reads the content of the reading mode memory 54 so as to know the reading mode previously used. Two cases may then occur:

the video mode is concerned: no modification is necessary.

the film mode is concerned: the comparator 53 reads the content of the frame type memory 55 so as to know the type of the preceding frame. If this is a frame of the type F5, this will signify that there is a passage from the film mode to the video mode and the comparator 53 writes the new reading mode into the reading mode memory 54 (as a sequence of film-type images always ends with a frame P, it is not necessary to verify whether the GOP change has been authorized). If not, this means that a sequence of film-type images is now present. The content of the frame type memory 55 is incremented by one.

When it is activated by the comparator 53, the motion detection circuit 57 reads the fields T1, T2, T4, T5, T6 and T7 from the picture memory 52. Subsequently it verifies whether the sequence of frames is animated (for this it is sufficient that one of the following inequalities is verified: T1≠T5, T1≠T7, T5≠T7, T2≠T4, T4≠T6 or T2≠T6). If the sequence is fixed, it is not necessary to change the reading mode. The motion detection circuit 57 thus only sends an activation order to the control circuit 56 when the sequence is animated.

The control circuit 56 is activated by the motion detection circuit 57 when the video mode changes to the film mode. On the basis of the category (I, P or B) of the preceding transmitted frame and as a function of the parameters M and N used, it verifies whether the frame to be transmitted is a frame B. In this case it sets the contents of the frame type memory 55 at one and subsequently writes in the reading mode memory 54 that the new reading mode is the film mode. If not, it is not possible to create a new GOP and the change of the type of the sequence of frames is not detected and the contents of the memories 54 and 55 are not modified.

The reading circuit 58 reads two fields at regular time intervals from the picture memory 52 in accordance with the reading mode provided by the reading mode memory 54. If the film mode is concerned, the reading circuit 58 reads the type of current frame from the frame type memory 55 so as to know the position of the fields to be read from the picture memory 52.

All the above-mentioned comparisons should preferably be realised on the luminance and chrominance signals. Moreover, the relations of equality are only verified if the "3:2 pulldown" repetition is numerically realised and if no analog treatment has followed. In the opposite case, the notion of equality should be redefined. It is, for example possible to count the pixels of the fields under consideration for which the luminance and/or chrominance differs by less than a first predefined quantity. If the number of these pixels surpasses a given percentage and if the other pixels differ in luminance and/or chrominance by less than a second predefined quantity, the fields are considered as being equal.

Figure 9:
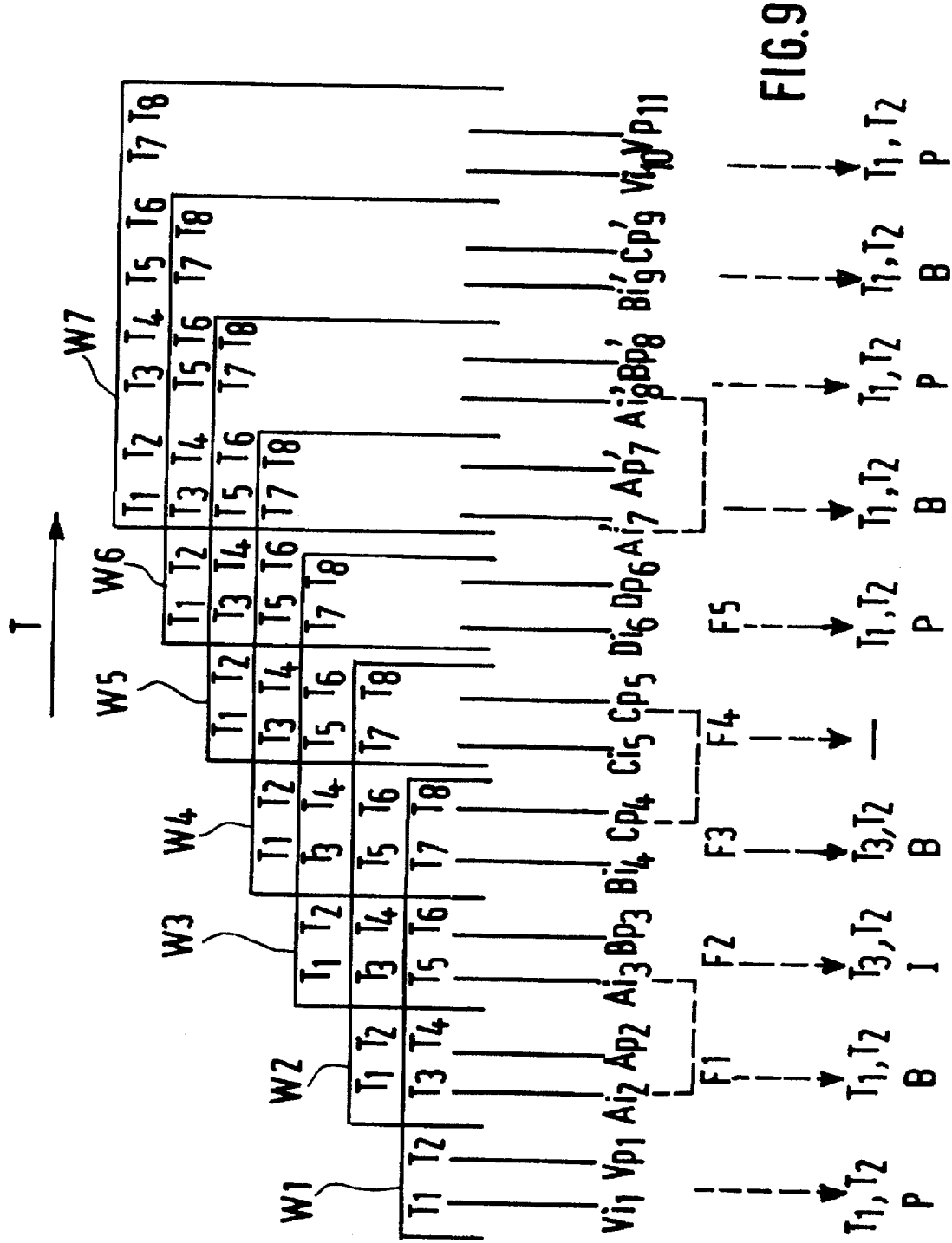
FIG. 9 shows a diagram of an example of operation of an encoding device according to the invention.

FIG. 9 shows for an example of a sequence of frames the fields read by the reading circuit 58. It shows a sequence of 10 frames composed of a first video-type image whose fields are numbered $Vi_1$ and $Vp_1$, followed by a succession of 8 film-type images whose fields are numbered $Ai_2$, $Ap_2$, $Ai_3$, $Bp_3$, $Bi_4$, $Cp_4$, $Ci_5$, $Cp_5$, $Di_6$, $Dp_6$, $Ai'_7$, $Ap'_7$, $Ai'_8$, $Bp'_8$, $Bi'_9$ and $Cp'_9$, respectively, followed by a succession of video-type images of which only the first frame is shown. Its two fields are numbered $Vi_{10}$ and $Vp_{10}$. The device successively performs the following operations:

In position W1 the search window contains the fields $Vi_1$ to $Cp_4$. The film pattern is not identified and the picture memory 52 reads in the video mode and thus the fields T1 and T2 (i.e. $Vi_1$ and $Vp_1$) are read by the reading circuit 58. The corresponding frame is a frame P.

The search window moves to a position W2 in which it contains the fields $Ai_2$ to $Cp_5$. The two first fields of the window form a frame of the type F1. The film pattern is then identified. As the frame read at the preceding stage is a frame P, the frame formed by the two fields which are read in this stage is a frame B. The change of the GOP is thus possible: there is a change-over to the film reading mode. The fields T1 and T2 are read by the reading circuit 58 (i.e. $Ai_2$ and $Ap_2$).

In position W3 the search window contains the fields $Ai_3$ to $Dp_6$. The two first fields of the window form a frame of the type F2 and the reading mode thus remains in the film mode, and the fields T3 and then T2 (i.e. $Bi_4$ and $Bp_3$) are read by the reading circuit 58. The corresponding frame is a frame I.

In position W4 the search window contains the fields $Bi_4$ to $Ap'_7$. The two first fields of the window form a frame of the type F3. The fields T3 and T2 ($Ci_5$ and $Cp_4$) are thus read by the reading circuit 58. The corresponding frame is a frame B.

In position W5 the search window contains the fields $Ci_5$ to $Bp'_8$. The two first fields of the window form a frame of the type F4: no field is read by the reading circuit 58.

In position W6 the search window contains the fields $Di_6$ to $Cp'_9$. The fields T1 and T2 ($Di_6$ and $Dp_6$) which form a frame of the type F5 are read by the reading circuit 58. The corresponding frame is a frame P.

In position W7 the search window does not contain a complete film pattern. The frame read at the preceding stage is a frame P. A change of the GOP is thus possible: the reading mode is the video mode again. The reading circuit 58 thus reads at each stage from this instant the fields T1 and T2 (i.e. the fields $Ai'_7$, $Ap'_7$, $Ai'_8$, $Bp'_8$, $Bi'_9$, $Cp'_9$, $Vi_{10}$ and $Vp_{10}$ in a chronological order, which correspond to frames of the category B, I, B and P, respectively.

Thus, in the FIG. 8 embodiment, the function of the detecting means 12 is implemented by the frame memory 52 and comparator 53. The function of the switch 13 is implemented by the control circuit 56, the mode and frame type memories 54, 55, and the read circuit 58. The preprocessor 14 is represented by the control circuit 56 and the read circuit 58.

Conversely, when a sequence of frames alternately comprising film-type image sequences and video-type image sequences is transmitted after treatment by an encoding device of the type described with reference to FIG. 8, this sequence of frames is decoded, in accordance with the invention, with the aid of a decoding device of the type described with reference to FIG. 10.

Figure 10:
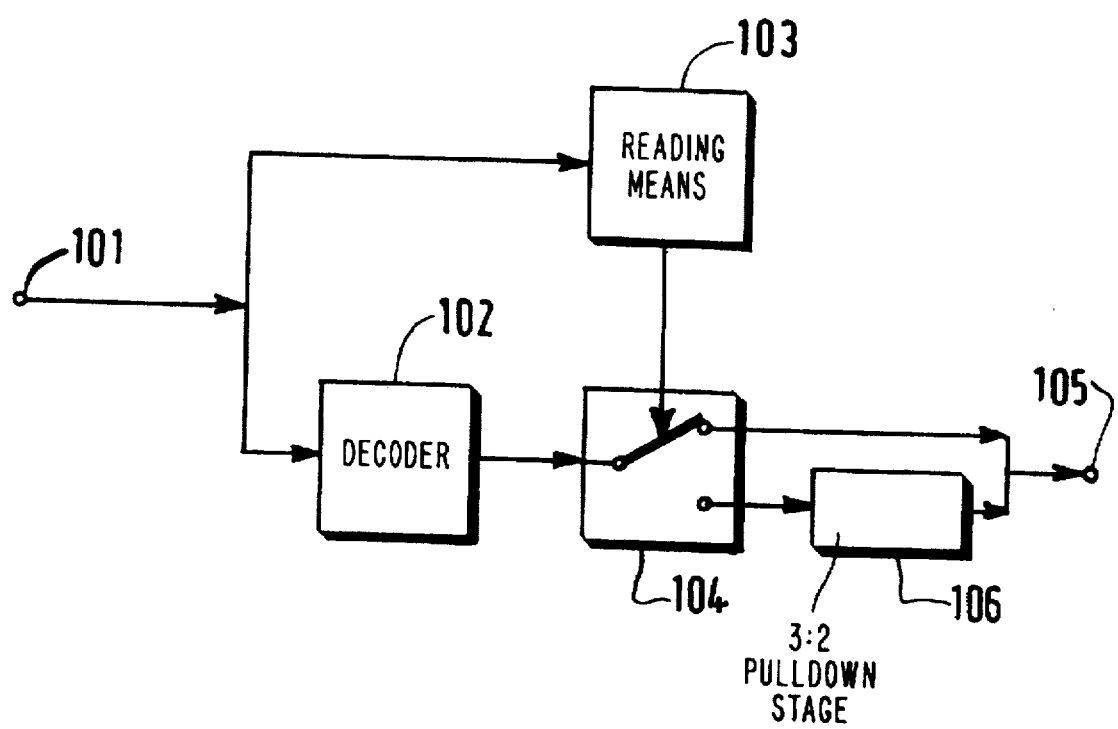
FIG. 10 is a principal circuit diagram illustrating the decoding device according to the invention.

As is shown in FIG. 10, a stream of data of the MPEG format is applied to the input 101 of the decoding device which is connected to the input of a module 102 for restoring the sequence of frames previously encoded, which module is constituted by a conventional decoder of the MPEG type, and means 103 for reading the frequency of the incoming sequences. The decoded data from this decoder 102 are applied to a switch 104 controlled by reading means 103. The switch 104 directs the stream of decoded data directly towards the output 105 of the decoding device when video-type images are concerned, or via a stage 106 for a "3:2 pulldown" conversion when film-type images are concerned. Once their frequency is converted to 30 Hz, these frames are supplied from the output 105 of the decoding device and can be transmitted by a television system operating at 60 Hz.

It will be evident that modifications of the embodiments described hereinbefore are possible, particularly by substitution of equivalent technical means, without passing beyond the scope of the invention.

Particularly the parameters M and N, the size of the search window (which involves a modification of the size of the picture memory used) and the amplitude of its displacement may have values which differ from those used in this description.

I claim:

1. A device for decoding signals, referred to as encoded signals, corresponding to frame sequences comprising video-type image sequences and film-type image sequences which have previously been encoded, which device comprises:

a module for restoring the frame sequences, means for reading the frequency of a sequence of frames from a stream of encoded signals, and means for switching, in response to reading of the frequency, from a first to a second mode of operation of the module for restoring the frame sequences, said module for restoring the frame sequences comprising, exclusively in the second mode of operation, a stage for converting the frequency of the decoded film-type images into the frequency of the video-type images by adding an appropriate number of duplicated fields.

2. A device for encoding a stream of digital input signals corresponding to sequences of frames constituted by video-type images and film-type images, comprising:

a) first means for encoding the digital input signals, said first means having a first operating mode for processing video-type images and a second operating mode for processing film-type images, b) second means for detecting from a stream of digital input signals a sequence of film-type images, said second means comprising a circuit for marking at least a characteristic sign of a sequence of film-type images, c) third means in response to the second means detecting sequences of film-type images for switching the first means from its first to its second mode of operation, d) said first means comprising a stage for preprocessing digital input signals only when in its second operating mode, such that the film-type images are restored by only eliminating duplicate fields of the film-type images.

3. A device for encoding a stream of digital input signals corresponding to sequences of frames constituted by video-type images and film-type images, said film-type images having been produced from original film-type images having a frequency below that of video-type images in a given ratio and converted to the same frequency as that of the video-type images by having been separated into two interlaced fields and subsequently introducing an appropriate number of duplicated fields fixed by said ratio, comprising:

a) first means for encoding the digital input signals, said first means having a first operating mode for processing video-type images and a second operating mode for processing film-type images, b) second means for detecting from a stream of digital input signals a sequence of film-type images, said second means comprising a circuit for marking at least a characteristic sign of a sequence of film-type images, said characteristic sign being constituted by a film pattern formed by the duplicated fields in a sequence of frames, c) third means in response to the second means detecting sequences of film-type images for switching the first means from its first to its second mode of operation, d) said first means comprising a stage for preprocessing digital input signals only when in its second operating mode, said stage for preprocessing comprising means for causing the inverse conversion of frequency of the film-type images from a frequency the same as that of video-type images to a frequency below that of the video-type images by only eliminating the introduced duplicated fields such that only original film-type images remain.

4. An encoding device as claimed in claim 3, wherein said first means is of an MPEG type having restrictions authorizing encoding only per group of frames of a predetermined length, said second means further comprising a control circuit for verifying whether an inverse conversion of frequency is authorized for a current frame within the restrictions imposed by the first means and connected to the first means for controlling when the stage for preprocessing can be operated for causing the inverse conversion of frequency.

5. A device for encoding a stream of digital input signals corresponding to sequences of frames constituted by video-type images and film-type images, said film-type images having been produced from original film-type images having a frequency below that of video-type images in a given ratio and converted to the same frequency as that of the video-type images by having been separated into two interlaced fields and subsequently introducing an appropriate number of duplicated fields fixed by said ratio, comprising:

a) first means for encoding the digital input signals, said first means having a first operating mode for processing video-type images and a second operating mode for processing film-type images, b) second means for detecting from a stream of digital input signals a sequence of film-type images, said second means comprising a circuit for marking at least a characteristic sign of a sequence of film-type images, said characteristic sign being constituted by a film pattern formed by the duplicated fields in a sequence of frames, said second means further comprising:

i) a picture memory for storing a sequence of frames which is sufficiently long to allow detection of said film pattern, ii) a comparator connected to the picture memory for detecting the film pattern in the sequence of frames in said picture memory, c) third means in response to the second means detecting sequences of film-type images for switching the first means from its first to its second mode of operation, d) said first means comprising a stage for preprocessing digital input signals only when in its second operating mode, said stage for preprocessing comprising means for causing the inverse conversion of frequency of the film-type images from a frequency the same as that of video-type images to a frequency below that of the video-type images by eliminating the introduced duplicated fields.

6. An encoding device as claimed in claim 5, wherein said first means comprises a motion-detecting circuit for detecting motion between the fields of a sequence of frames which do not constitute the film pattern and connected to the third means for preventing switching to the second mode of operation when no motion is detected.

7. A device for encoding a stream of digital input signals corresponding to sequences of frames constituted by video-type images and film-type images, said film-type images having been produced from original film-type images having a frequency below that of video-type images in a given ratio and converted to the same frequency as that of the video-type images by having been separated into two interlaced fields and subsequently introducing an appropriate number of duplicated fields fixed by said ratio, comprising:

a) first means for encoding the digital input signals, said first means having a first operating mode for processing video-type images and a second operating mode for processing film-type images, said first means being of an MPEG type having restrictions authorizing encoding only per group of frames of a predetermined length, b) second means for detecting from a stream of digital input signals a sequence of film-type images, said second means comprising a circuit for marking at least a characteristic sign of a sequence of film-type images, said characteristic sign being constituted by a film pattern formed by the duplicated fields in a sequence of frames, c) third means in response to the second means detecting sequences of film-type images for switching the first means from its first to its second mode of operation, d) said first means comprising a stage for preprocessing digital input signals only when in its second operating mode, said stage for preprocessing comprising means for causing the inverse conversion of frequency of the film-type images from a frequency the same as that of video-type images to a frequency below that of the video-type images by eliminating the introduced duplicated fields, e) said second means further comprising a control circuit for verifying whether an inverse conversion of frequency is authorized for a current frame within the restrictions imposed by the first means and connected to the first means for controlling when the stage for preprocessing can be operated for causing the inverse conversion of frequency.

8. An encoding device as claimed in claim 7, wherein said means for causing the inverse conversion of frequency comprises a reading circuit for reading at regular time intervals only interlaced fields which correspond to an original film-type image from the picture memory.

9. A device for encoding a stream of digital input signals corresponding to sequences of frames constituted by video-type images and film-type images, said film-type images having been produced from original film-type images having a frequency below that of video-type images in a given ratio and converted to the same frequency as that of the video-type images by having been separated into two interlaced fields and subsequently introducing an appropriate number of duplicated fields fixed by said ratio, comprising:

a) first means for encoding the digital input signals, said first means having a first operating mode for processing video-type images and a second operating mode for processing film-type images, b) second means for detecting from a stream of digital input signals a sequence of film-type images, said second means comprising a circuit for marking at least a characteristic sign of a sequence of film-type images, said characteristic sign being constituted by a film pattern formed by the duplicated fields in a sequence of frames, c) third means in response to the second means detecting sequences of film-type images for switching the first means from its first to its second mode of operation, d) said first means comprising a stage for preprocessing digital input signals only when in its second operating mode, said stage for preprocessing comprising means for causing the inverse conversion of frequency of the film-type images from a frequency the same as that of video-type images to a frequency below that of the video-type images by eliminating the introduced duplicated fields, e) fourth means comprising a motion-detecting circuit for detecting motion between the fields of a sequence of frames which do not constitute the film pattern and connected to the third means for preventing switching to the second mode of operation when no motion is detected.

10. An encoding device as claimed in claim 9, wherein said first means is of an MPEG type having restrictions authorizing encoding only per group of frames of a predetermined length, said second means further comprising a control circuit for verifying whether an inverse conversion of frequency is authorized for a current frame within the restrictions imposed by the first means and connected to the first means for controlling when the stage for preprocessing can be operated for causing the inverse conversion of frequency.

11. An encoding device as claimed in claim 9, wherein said means for causing the inverse conversion of frequency comprises a reading circuit for reading at regular time intervals only interlaced fields which correspond to an original film-type image from the picture memory.

12. A device for encoding a stream of digital input signals corresponding to sequences of frames constituted by video-type images and film-type images, said film-type images having been produced from original film-type images having a frequency below that of video-type images in a given ratio and converted to the same frequency as that of the video-type images by having been separated into two interlaced fields and subsequently introducing an appropriate number of duplicated fields fixed by said ratio, comprising:

a) first means for encoding the digital input signals, said first means having a first operating mode for processing video-type images and a second operating mode for processing film-type images, b) second means for detecting from a stream of digital input signals a sequence of film-type images, said second means comprising a circuit for marking at least a characteristic sign of a sequence of film-type images, said characteristic sign being constituted by a film pattern formed by the duplicated fields in a sequence of frames, said second means further comprising:

i) a picture memory for storing a sequence of frames which is sufficiently long to allow detection of said film pattern, ii) a comparator connected to the picture memory for detecting the film pattern in the sequence of frames in said picture memory, c) third means in response to the second means detecting sequences of film-type images for switching the first means from its first to its second mode of operation, d) said first means comprising a stage for preprocessing digital input signals only when in its second operating mode, said stage for preprocessing comprising means for causing the inverse conversion of frequency of the film-type images from frequency the same as that of video-type images to a frequency below that of the video-type images by eliminating the introduced duplicated fields, said means for causing the inverse conversion of frequency comprising a reading circuit for reading at regular time intervals only interlaced fields from the picture memory.

13. An encoding device as claimed in claim 12, wherein said first means is of an MPEG type having restrictions authorizing encoding only per group of frames of a predetermined length, said second means further comprising a control circuit for verifying whether an inverse conversion of frequency is authorized for a current frame within the restrictions imposed by the first means and connected to the first means for controlling when the stage for preprocessing can be operated for causing the inverse conversion of frequency.

14. An encoding device as claimed in claim 12, wherein said first means comprises a motion-detecting circuit for detecting motion between the fields of a sequence of frames which do not constitute the film pattern and connected to the third means for preventing switching to the second mode of operation when no motion is detected.

* * * * *